United States Patent [19]

Satoh et al.

[11] Patent Number: 5,027,692

[45] Date of Patent: Jul. 2, 1991

[54] BRAKE BOOSTER WITH TUBULAR GUIDE MEMBER

[75] Inventors: Satoru Satoh; Haruo Suzuki, both of Saitama, Japan

[73] Assignee: Jidosha Kiki Co., Ltd., Tokyo, Japan

[21] Appl. No.: 385,696

[22] Filed: Jul. 26, 1989

[30] Foreign Application Priority Data

Aug. 15, 1988 [JP] Japan .................................. 63-203028

[51] Int. Cl.⁵ ............................. F15B 9/12; F16J 15/18
[52] U.S. Cl. .................................. 91/376 R; 91/369.2; 92/48; 92/165 R
[58] Field of Search ..................... 91/368, 369.1, 369.2, 91/369.3, 369.4, 376 R; 92/48, 49, 150, 151, 165 R

[56] References Cited

U.S. PATENT DOCUMENTS

| | | | |
|---|---|---|---|
| 2,587,403 | 2/1952 | Stelzer | 91/376 |
| 2,980,068 | 4/1961 | Stelzer | 91/369.4 X |
| 2,989,035 | 6/1961 | Stelzer | 92/48 |
| 2,990,917 | 7/1961 | Stelzer | 91/369.4 X |
| 3,696,711 | 10/1972 | Berg et al. | 92/165 R X |
| 4,423,665 | 1/1984 | Haar | 91/369.4 |
| 4,484,509 | 11/1984 | Belart et al. | 91/369.2 |
| 4,524,584 | 6/1985 | Kobayashi | 91/369.2 X |
| 4,531,370 | 7/1985 | Hendrickson et al. | 91/369.2 X |
| 4,567,812 | 2/1986 | Weiler et al. | 91/376 R X |
| 4,881,451 | 11/1989 | Newhouse | 91/376 R X |

Primary Examiner—Edward K. Look
Assistant Examiner—John Ryznic
Attorney, Agent, or Firm—Flynn, Thiel, Boutell & Tanis

[57] ABSTRACT

A brake booster such as a tandem brake booster including a center plate disposed within a shell is disclosed. The center plate is connected to a valve body disposed within the shell by seal means in the form of a diaphragm, thus allowing the entire length of the valve body and hence of the brake booster to be reduced as compared with the prior art arrangement.

7 Claims, 1 Drawing Sheet

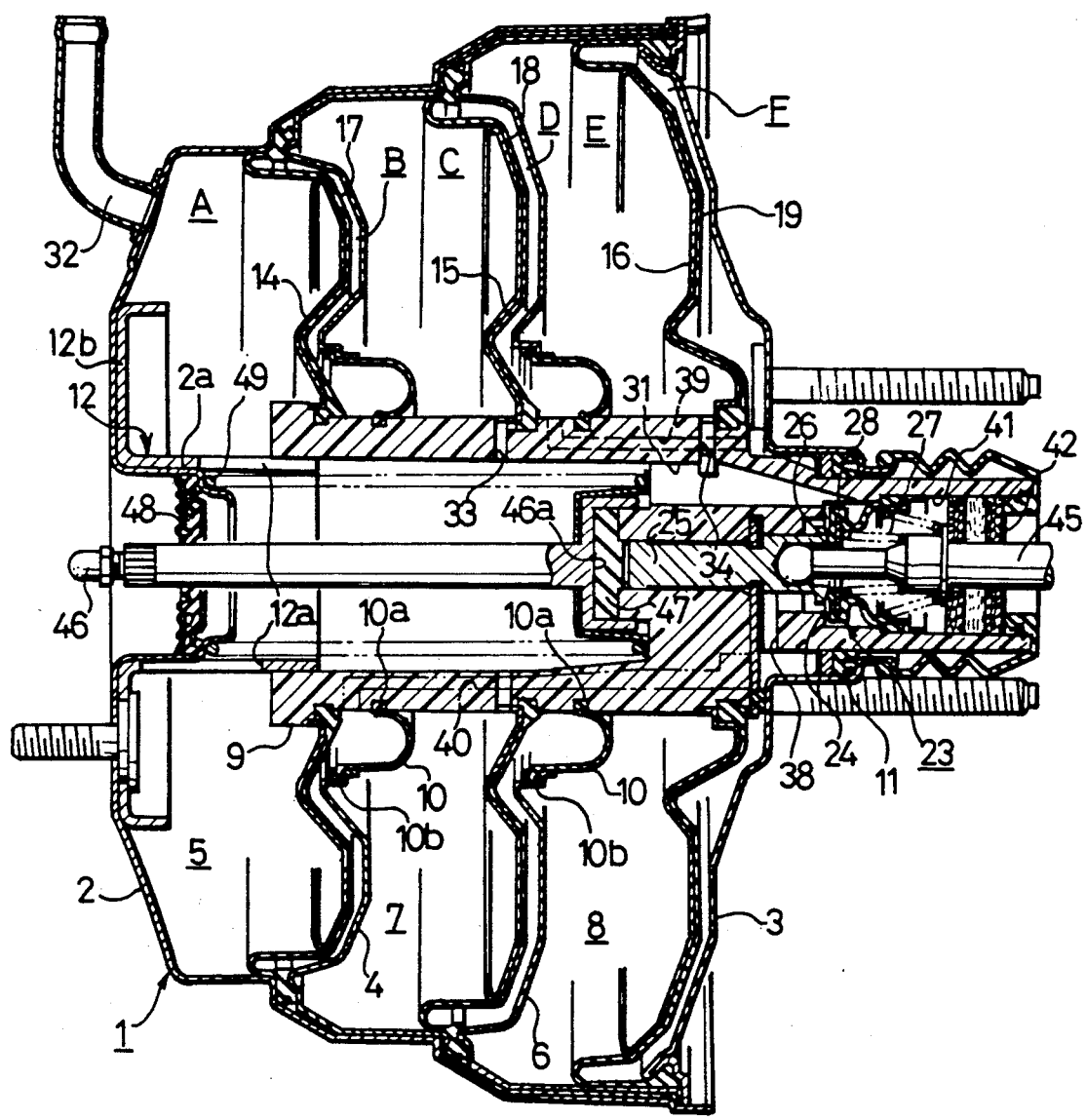

BRAKE BOOSTER WITH TUBULAR GUIDE MEMBER

FIELD OF THE INVENTION

The invention relates to a brake booster, and more particularly, to a brake booster such as a tandem brake booster in which a center plate is disposed within a shell.

DESCRIPTION OF THE PRIOR ART

Generally, a tandem brake booster comprises a center plate which divides the interior of a shell into a pair of chambers, a valve body slidably extending through the center plate, seal means for maintaining a hermetic seal between the center plate and the valve body, power pistons disposed in the respective chambers divided by the center plate and connected to the valve body, and diaphragms applied to the back side of the respective power pistons to divide each of the chambers into a constant pressure chamber and a variable pressure chamber (see Japanese Patent Publications No. 9,970/1969 and No. 23,913/1978 and Japanese Laid-Open Patent Application No. 154,952/1985).

The seal means which maintains a hermetic seal between the center plate and the valve body usually comprises an annular seal member formed of rubber, the outer periphery of which is secured to the inner peripheral edge of an opening formed in the center plate and the inner periphery of which is disposed in sliding contact with the outer peripheral surface of the valve body, thus maintaining a hermetic seal between the valve body and the center plate.

It is necessary that the power pistons be connected to the valve body on opposite sides of the seal member. It will be seen that in order to allow a stroking of the valve body through a given distance, the both power pistons must be mounted on the valve body with a spacing therebetween which is equal to the magnitude of the stroke added with the length of the seal member. Consequently, the entire length of the valve body and hence of the brake booster will increase.

SUMMARY OF THE INVENTION

In view of the foregoing, the invention provides; in a brake booster comprising a center plate which divides the interior of a shell into a plurality of chambers, a valve body slidably extending through the center plate, seal means for maintaining a hermetic seal between the center plate and the valve body, power pistons disposed within the respective chambers divided by the center plate and connected to the valve body, and diaphragms applied to the back side of the respective power pistons to divide each chamber into a constant pressure chamber and a variable pressure chamber; a diaphragm which serves as the seal means mentioned above, a bead extending around the inner periphery of the diaphragm being connected to the valve body in a hermetically sealed manner and a bead extending around the outer periphery of the diaphragm being connected to the center plate in a hermetically sealed manner.

With this arrangement, it becomes unnecessary to provide a spacing between the power pistons which includes an amount corresponding to the length of the seal member as required in the prior art when mounting the power pistons on the valve body. Accordingly, the entire length of the valve body and hence of the brake booster can be reduced by a corresponding amount.

Above and other objects, features and advantages of the invention will become apparent from the following description of an embodiment thereof with reference to the drawing.

BRIEF DESCRIPTION OF DRAWING

The single drawing is a side elevation, mostly in longitudinal section, of one embodiment of the invention.

DETAILED DESCRIPTION OF EMBODIMENT

Referring to the single drawing, an embodiment of the invention as applied to a brake booster of triple type will be described. Specifically, a shell 1 comprises a front shell section 2 in the form of a stepped cup and a substantially dish-shaped rear shell section 3 which closes the opening of the shell section 2. A front side center plate 4 in the form of a stepped cup generally conforming to the internal surface of the front shell section 2 is fitted into the front shell section 2, thus defining a front chamber 5 between an end wall surface of the front side center plate 4 and an end wall surface of the front shell section 2.

A cup-shaped rear side center plate 6 is fitted into the front side center plate 4, defining a center chamber 7 between end wall surfaces of the center plates 6 and 4 while simultaneously defining a rear chamber 8 between end wall surfaces of the plate 6 and the rear shell section 3.

Each of the center plates 4 and 6 and the rear shell section 3 is centrally formed with an opening in alignment with their axes, through which a valve body 9 is slidably disposed. Diaphragms 10 provide seal means between the respective center plates 4, 6 and the valve body 9, and an annular seal member 11 provides a hermetic seal between the rear shell section 3 and the valve body 9. Each diaphragm 10 includes a bead 10a extending around its inner periphery which is connected to the outer peripheral surface of the valve body 9 in a hermetically sealed manner and also includes a bead 10b extending around the outer periphery thereof which is connected to the peripheral edge of the openings formed in the respective center plates 4, 6 in a hermetically sealed manner, thus providing a seal between the individual chambers 5, 7 and 8.

The end wall of the front shell section 2 is centrally formed with a tubular portion 2a, on which a cylindrical guide member 12 is mounted, and the inner end portion of the valve body 9 is slidably fitted over the guide member 12 in order to enable a reciprocatory movement of the valve body 9 along the axis of the shell 1.

A front power piston 14, a center power piston 15 and a rear power piston 16 are disposed in the front chamber 5, the center chamber 7 and the rear chamber 8, respectively, and are connected to the valve body 9. A front diaphragm 17, a center diaphragm 18 and a rear diaphragm 19 are applied to the back side of the respective power pistons 14 to 16.

The front diaphragm 17 divides the front chamber 5 into a forwardly located, constant pressure chamber A and a rearwardly located, variable pressure chamber B. Similarly, the center diaphragm 18 divides the center chamber 7 into a constant pressure chamber C and a variable pressure chamber D, and the rear diaphragm 19 divides the rear chamber 8 into a constant pressure chamber E and a variable pressure chamber F.

A valve mechanism 23 which is known in itself is housed within the valve body 9, and comprises an annular, first valve seat 24 formed on the valve body 9, an annular, second valve seat 26 formed on the right end of a valve plunger 25, which is slidably disposed within the valve body 9, at a location radially inward of the first valve seat 24, and a valve element 28 adapted to be seated upon either valve seat 24 or 26 from the right, as viewed in FIG. 1, under the resilience of a spring 27.

A space radially outward of an annular seal defined by the contact between the first valve seat 24 and the valve element 28 communicates with the constant pressure chamber A of the front chamber 5 through an axially extending constant pressure passage 31 which is formed in the valve body 9, and the chamber A communicates with a source of negative pressure, such as an intake manifold, not shown, through a tubing 32 mounted on the front shell section 2 for introducing a negative pressure. The valve body 9 is also formed with a radially extending constant pressure passage 33 which provides a communication between the constant pressure passage 31 and the constant pressure chamber C of the center chamber 7, and another radially extending, constant pressure passage 34 which provides a communication between the constant pressure passage 31 and the constant pressure chamber E of the rear chamber 8. Accordingly, a negative pressure which has been introduced into the constant pressure chamber A can be normally introduced into other constant pressure chambers C and E through the passages 31, 33 and 34.

A space located radially inward of an annular seal defined by the contact between the first valve seat 24 and the valve element 28 and located radially outward of another annular seal defined by the contact between the second valve seat 26 and the valve element 28, or a space intermediate the both annular seals, communicates with the variable pressure chamber F of the rear chamber 8 through a radially extending, variable pressure passage 38 which is formed in the valve body 9. The chamber F communicates with the variable pressure chamber D of the center chamber 7 through a first variable pressure passage 39 which is formed in the valve body 9, and communicates with the variable pressure chamber B of the front chamber 5 through a second variable pressure passage 40 which is formed in the valve body 9 independently from the first passage 39.

On the other hand, a space located radially inward of an annular seal defined by the contact between the second valve seat 26 and the valve element 28 communicates with the atmosphere through an axial pressure passage 41 and a filter 42.

The right end of the valve plunger 25 which is slidably disposed within the valve body 9 is connected to an input shaft 45 which is mechanically coupled to a brake pedal, not shown, while the left end of the plunger 25 is disposed in opposing relationship with the right end face of a reaction disc 47 which is received in a recess 46a formed in one end of a push rod 46. The left end of the push rod 46 slidably extends through the axial portion of the front shell section 1 and a seal member 48 to the exterior of the shell for connection with a piston of a master cylinder, not shown. The valve body 9 is normally maintained in its inoperative position shown by a return spring 49.

As mentioned above in its end wall, the front shell section 2 is centrally formed with the tubular portion 2a over which the cylindrical guide member 12 is mounted, and the inner end of the valve body 9 slidably fits over the guide member 12, thus allowing a reciprocatory motion of the valve body 9 along the axis of the shell 1 while preventing its oscillating motion. It will be seen that at a given position, the guide member 12 is formed with an axially extending slit 12a to assure a communication between the constant pressure chamber A and the constant pressure passage 31 formed in the valve body 9. The guide member 12 includes a radially outwardly extending annular flange 12b at its front end, which flange is attached to the front shell section 2 and reinforces the front shell section as shown in the drawing. The guide member 12 is of one-piece construction.

In the inoperative condition of the brake booster when a brake pedal is not depressed, the valve element 28 is seated upon the second valve seat 26 which is formed on the valve plunger 25 to close the pressure passage 41 which communicates with the atmosphere while the valve element 28 is spaced from the first valve seat 24, whereby the constant pressure passage 31 which is maintained in communication with the constant pressure chambers A, C and E communicates with the variable pressure passage 38 which communicates with the variable pressure chambers B, D and F, whereby a negative pressure is introduced into all of the chambers A to F.

If a brake pedal is now depressed to drive the input shaft 45 to the left, the valve element 28 becomes seated upon the first valve seat 24 and moves away from the second valve seat 26. Thus, a communication between the constant pressure passage 31 and the variable pressure passage 38 is interrupted, whereby a communication between the constant pressure chambers A, C and E and the variable pressure chambers B, D and F is interrupted, while the atmosphere is admitted into the variable pressure chambers B, D and F.

Thereupon, a pressure differential is developed between the constant pressure chambers A, C and E and the variable pressure chambers B, D and F, respectively, so that the power pistons 14, 15, 16 are driven to the left in integral manner with the valve body 9, thus causing the push rod 27 to be driven forward, which would cause a braking liquid pressure to be produced within a master cylinder, not shown, for exercising a braking action.

If a brake pedal is now released, a flow path within the valve mechanism 23 is switched to interrupt the communication between the atmosphere and the variable pressure chambers B, D and F, which then communicate with the constant pressure chambers A, C and E, thus allowing the atmosphere which has been contained within the variable pressure chambers B, D and F to be displaced through the constant pressure chamber A to a source of negative pressure, not shown. When the pressure in each of the variable pressure chambers B, D and F decreases in this manner, the power pistons 14 to 16 are returned to their original inoperative position under the resilience of the return spring 49.

In the present embodiment, diaphragms 10 are used to maintain a hermetic seal between the center plates 4, 6 and the valve body 9. It will be appreciated that this allows the axial size of the valve body 9 to be reduced as compared with a conventional arrangement employing an annular seal member where there has been a need to provide an allowance corresponding to such seal member in locating the front power piston 14 and the center power piston 15 on the valve body 9 as well as mounting the center power piston 15 and the rear power piston 16 on the valve body 9 in order to avoid the abutment of these power pistons against such seal member.

While the invention has been applied to the both power pistons 15 and 16 in the above embodiment, it will be appreciated that the invention may be applied to only one of these power pistons and that the invention is equally applicable to a conventional tandem brake booster.

While the invention has been disclosed above in connection with a preferred embodiment thereof, it should be understood that a number of changes, modifications and substitutions therein will readily occur to one skilled in the art from the above disclosure without departing from a scope and spirit of the invention defined by the appended claims.

What is claimed is:

1. A brake booster comprising a center plate which divides the interior of a shell into a pair of chambers, a valve body slidably extending through the center plate, seal means for maintaining a hermetic seal between the center plate and the valve body, power pistons disposed in the chambers divided by the center plate and connected to the valve body, and diaphragms applied to the back side of the respective power pistons to divide each chamber into a constant pressure chamber and a variable pressure chamber;

wherein the seal means comprises a diaphragm having a bead extending around its inner periphery which is connected to the valve body in a hermetically sealed manner and also having a bead extending around its outer periphery which is connected to the center plate in a hermetically sealed manner, the shell comprising a front shell section and a rear shell section, a tubular guide member being mounted centrally on an inner wall of the front shell section, and an inner end of the valve body being slidably fitted over the guide member to prevent an oscillating motion of the valve body.

2. A brake booster according to claim 1 in which the center plate divides the interior of the shell into a pair of chambers to form a tandem brake booster.

3. A brake booster according to claim 1 in which a plurality of center plates are provided, including a front side center plate and a rear side center plate, which divide the interior of the shell into three chambers, thereby forming a brake booster of triple type.

4. A brake booster according to claim 1 in which the diaphragm serving as the seal means has its bead extending around its outer periphery connected to a cylindrical portion of the center plate which is formed around its inner periphery so that when a stroking operation of the valve body occurs, an inner periphery of one of the power pistons moves into overlapping relationship with the cylindrical portion of the center plate.

5. A brake booster according to claim 1, wherein one of said constant pressure chambers is defined between said front shell section and one of said power piston diaphragms, said valve body including means defining a constant pressure passage therein, and said tubular guide member including means defining a slit therein which permits fluid communication between said constant pressure passage and said one constant pressure chamber.

6. A brake booster according to claim 1, wherein said tubular guide member includes a radially outwardly extending annular flange at a front end thereof, said flange being attached to said front shell section for reinforcement of said front shell section, said tubular guide member being formed as one piece including said flange, and said tubular guide member projecting rearwardly from a radially inner end of said flange.

7. A brake booster according to claim 1, wherein said tubular guide member includes a radially outwardly extending annular flange at a front end thereof, said flange being attached to said front shell section for reinforcement of said front shell section, said tubular guide member being formed as one piece including said flange, and said tubular guide member projecting rearwardly from a radially inner end of said flange.

* * * * *